US006024520A

United States Patent [19]

Haughton et al.

[11] Patent Number: 6,024,520

[45] Date of Patent: Feb. 15, 2000

[54] AUGER DRILL BIT

[75] Inventors: Keith Louis Haughton, Midland; Glenn Wallace Haughton, Toronto, both of Canada

[73] Assignee: Haughton Tools Ltd., Brampton, Canada

[21] Appl. No.: 08/917,298

[22] Filed: Aug. 25, 1997

[51] Int. Cl.$^{7}$ ........................................................ B23B 51/00

[52] U.S. Cl. ........................... 408/199; 408/212; 408/225

[58] Field of Search .................................... 408/199, 211, 408/212, 213, 214, 225, 230, 713, 223

[56] References Cited

U.S. PATENT DOCUMENTS

| | | | |
|---|---|---|---|
| 450,908 | 4/1891 | Brede et al. | 408/213 |
| 567,271 | 9/1896 | Howard, Jr. et al. | 408/214 |
| 631,572 | 8/1899 | Judson | 408/211 |
| 931,593 | 8/1909 | Garner | 408/213 |
| 1,066,707 | 7/1913 | Caldwell | 408/212 |
| 3,947,143 | 3/1976 | Gulla . | |
| 4,050,841 | 9/1977 | Hildebrandt . | |
| 4,079,766 | 3/1978 | Conley et al. . | |
| 4,225,274 | 9/1980 | Katz . | |
| 4,244,667 | 1/1981 | Timmons | 408/213 |
| 4,625,593 | 12/1986 | Schmotzer . | |
| 4,950,111 | 8/1990 | Thomas . | |
| 5,074,722 | 12/1991 | Cochran . | |
| 5,193,951 | 3/1993 | Schimke . | |
| 5,244,319 | 9/1993 | Cochran | 408/214 |

FOREIGN PATENT DOCUMENTS

| | | |
|---|---|---|
| 1135539 | 11/1982 | Canada . |

OTHER PUBLICATIONS

Shopping for Drill Bits, Dec. 1994/Jan. 1995, Fine Homebuilding, pp. 70–75.

*Primary Examiner*—Andrea L. Pitts
*Assistant Examiner*—Adesh Bhargava
*Attorney, Agent, or Firm*—Nancy E. Hill; Hill & Schumacher

[57] ABSTRACT

An auger bit for forming bores having a circular cross section in a workpiece is disclosed. The bit has an elongate auger portion, a shank, a lead screw, a chisel blade, a spur blade, and a shearing blade. The elongate auger portion has an elongate shaft with a elongate helical land formed therein defining a flute between adjacent turns on the elongate helical land. The helical land has a lead edge and following portion. The shank is integrally connected to one end of the elongate auger portion and is adapted to engage a drill. The lead screw is integrally connected to the other end of the elongate auger portion and is for engaging the workpiece. The chisel blade extends outwardly from the leading edge of the elongate helical land and is for chipping material from the workpiece. The spur blade extends longitudinally from the elongate helical land in the direction of the lead screw. A cutting edge extends longitudinally from the following portion of the elongate helical land proximate to the leading edge. Preferably the cutting edge is a shearing blade which extends longitudinally into the flute between adjacent turns on the elongate helical land. The shearing blade may be attached between two adjacent turns on the helical land or attached to only one land. Preferably the shearing blade, the chisel blade and the spur blade are removable. Preferably the shearing blade and spur are integrally attached. Alternatively, shearing blade, spur and chisel blade may be integrally attached to form a removable and replaceable multipurpose blade.

13 Claims, 7 Drawing Sheets

AUGER DRILL BIT

FIELD OF THE INVENTION

This invention relates to wood boring tools and more particularly, to auger drill bits, which are generally used with an electric drill for forming bores in materials such as wood.

BACKGROUND OF THE INVENTION

Drill bits are a very common tool used in the construction and maintenance industries. There are a wide variety of drill bits that have been developed. Some drill bits are specific purpose drill bits while others are multipurpose drill bits.

The construction and maintenance industries involve the installation and maintenance of services such as wiring, plumbing and pipe fitting. Often these services are routed through structural members of a building. For example an electrician is commonly required to route wiring through wall studs, roof joists, floor joists and other structural elements. This installation process commonly requires the boring of holes through structural members.

A commonly used building material is wood. Wood is a nonuniform material and this non-uniformity can cause problems in the boring process. For example wood may have non-uniform density, knots, wood rot, and/or pitch pockets. In addition there may be nails or other fasteners that may interfere with the boring process.

Many different bit types may be used to bore a hole, each type uses a different mechanism and these mechanisms vary greatly. Typical boring bits that are generally available include a spade type bit, a hole saw type bit, a Forstner bit and an auger type bit. Problems that may arise when using these various types of bits include inadequate waste removal, limited self feeding action, binding of the bit in the bore, dulling of the cutting edges through wear and hitting nails, difficulty re-sharpening cutting edges, incomplete cutting or loss of operator control during some phases of the boring process.

The auger type drill has a number of advantages over the other drill bits. For example, the auger type drill bit typically has a self-feeding lead screw for urging the bit into the workpiece, a spur for severing the wood fibres to form the radius of the bore, a chisel cutting edge to lift the severed wood fibres, a helix shaped flute that proceeds up the body of the bit to provide a mechanism for waste removal.

However, there are a number of shortcomings of the existing wood auger type drill bits. These shortcomings include: the spur becomes dull and/or damaged or broken off; the chisel cutting edge becomes dull and/or damaged; the helix shaped flute is often too narrow and too shallow to sufficiently remove waste; and the cutting edges of the bit are difficult and tedious to resharpen accurately. Once cutting edges become dull, the bit fails to cut and causes excessive heat build up. Further, once cutting edges become dull or missing, performance drops and binding can occur.

Another major shortcoming of the wood auger bit is the incomplete cutting action that occurs as the bit emerges from the opposite (back) side of a workpiece. In use, as the self-feeding lead screw of the wood auger bit enters the workpiece a self-feeding action commences thus drawing the bit into the workpiece to such an extent that the spur scribes a circle in the workpiece around the point of entry and severs the fibres around this circle. The continuing rotation of the bit and subsequent advancement of the bit causes the chisel cutting edge to uplift the fibres previously severed, forming chips. Friction between the chips and the cylindrical surface of the created bore and the helical inclination of flute cause the chips to advance away from the chisel cutting edge and ultimately out of the bore. This process continues until the self-feeding lead screw emerges from the opposite (back) side of the workpiece. As the lead screw breaks through the opposite (back) side of the workpiece the self-feeding function of the lead screw is progressively lost and the bit is then forcibly advanced by the operator. Due to the loss of the self-feeding function, there is a substantial decrease in the cutting action and a subsequent increase in drill rpm. Depending on the resiliency and specific nature of the wood composition (knots or nails for example) at the exit location of the workpiece, a "D" shaped hole may result, with the self-feeding lead screw, the spur, the chisel cutting edge and a portion of the body of the bit extending out of the workpiece. Where a "D" shaped hole is formed, the higher rpm of the drill bit and the force of the operator may cause the leading edge of the flute to "ride" or travel briskly through the workpiece. This situation is most annoying and quite dangerous as the operator is not prepared nor able to resist this tendency.

Given a typical slope of a wood auger bit, an axial distance of approximately one inch is travelled per revolution of the bit, this coupled with an estimated 400 rpm of the bit will cause the bit, drill and operator to potentially be pulled toward the work at approximately 7 inches per second. Note this 7 inch travel is greater than the length of a typical auger bit itself. A drill operator is commonly unable to resist this pull, particularly in awkward drilling positions or where the axis of the bit does not extend through the centre of gravity of the operator as is often experienced in the field. At cutting speeds greater than 400 rpm these dangerous effects are even greater.

In order for the operator to finish boring this incomplete or "D" shaped hole, the operator must either reverse the wood auger bit manually or reverse the electric drill, if equipped with such a feature, and then attempt to redrill the incomplete hole in hopes of removing the remaining "D" shaped portion of the workpiece. This procedure is an unconventional use of the auger bit and may cause unpredictable actions as the bit may abruptly engage the remaining "D" shaped portion of the unfinished hole.

Therefore it would be beneficial to provide a bore forming tool that is capable of forming a generally circular opening upon exiting the workpiece and reducing the dangerous "pulling" tendency that exists with current auger bits. In addition it would be beneficial to provide a bore forming tool wherein the cutting edges can be easily replaced.

SUMMARY OF THE INVENTION

It is a general object of the present invention to provide an auger bit that forms generally cylindrical bores in material such as wood and the like with an efficient cutting mechanism and with a higher level of operator safety.

It is another object of the present invention to provide an auger bit that includes a replaceable shearing blade and spur system.

A further object of the present invention is to provide an auger bit that includes a replaceable chisel cutting edge.

An auger bit for forming bores having a circular cross section in a workpiece is disclosed. The bit has an elongate auger portion, a shank, a lead screw, a chisel blade, a spur blade, and a shearing blade. The auger portion has an elongate shaft with an elongate helical land formed therein defining a flute between adjacent turns on the elongate helical land. The helical land has a lead edge and following portion. The shank is integrally connected to one end of the elongate auger portion and is adapted to engage a drill. The lead screw is integrally connected to the other end of the elongate auger portion and is for engaging the workpiece. The chisel blade extends outwardly from the leading edge of the elongate helical land and is for chipping material from the workpiece. The spur blade extends longitudinally from the elongate helical land in the direction of the lead screw. A cutting edge extends longitudinally from the following portion of the elongate helical land proximate to the leading edge. Preferably the cutting edge is a shearing blade which extends longitudinally into the flute between adjacent turns on the elongate helical land. The shearing blade may be attached between two adjacent turns on the helical land or attached to only one turn of the helical land. Preferably the shearing blade, the chisel blade and the spur blade are removable. Preferably the shearing blade and spur are integrally attached. Alternatively, the shearing blade, spur and chisel blade may be integrally attached to form a removable and replaceable multipurpose blade.

In another aspect of the invention, an auger bit for forming bores having a circular cross section in a workpiece is disclosed. The auger bit has an elongate auger portion having an elongate shaft with an elongate helical land formed therein defining a flute between adjacent turns on the elongate helical land. The auger portion has a central longitudinal axis. A shank is integrally connected to one end of the elongate auger portion and is adapted to engage a drill. A lead screw is integrally connected to the other end of the elongate auger portion for engaging the workpiece. A chisel blade extends outwardly from the leading edge of the elongate helical land for chipping material from the workpiece. A releasably attachable spur extends longitudinally from the elongate helical land in the direction of the lead screw.

In a further aspect of the invention, an auger bit for forming bores having a circular cross section in a workpiece is disclosed. The auger bit has an elongate auger portion having an elongate shaft with an elongate helical land formed therein defining a flute between adjacent turns on the elongate helical land. The auger portion has a central longitudinal axis. A shank is integrally connected to one end of the elongate auger portion and is adapted to engage a drill. A lead screw is integrally connected to the other end of the elongate auger portion for engaging the workpiece. A releasably attachable chisel blade extends outwardly from the leading edge of the elongate helical land for chipping material from the workpiece.

In another aspect of the invention, an auger bit for forming bores having a circular cross section in a workpiece is disclosed. The auger bit has an elongate auger portion having an elongate shaft with an elongate helical land formed therein defining a flute between adjacent turns on the elongate helical land. The auger portion has a central longitudinal axis. A shank is integrally connected to one end of the elongate auger portion and is adapted to engage a drill. A lead screw is integrally connected to the other end of the elongate auger portion for engaging the workpiece. A chisel blade extends outwardly from the leading edge of the elongate helical land for chipping material from the workpiece. A releasably attachable unitary blade has a spur portion which extends longitudinally from the elongate helical land in the direction of the lead screw and a shearing blade portion extending into the flute between adjacent turns of the elongate helical land.

In a further aspect of the invention, an auger bit for forming bores having a circular cross section in a workpiece is disclosed. The auger bit has an elongate auger portion having an elongate shaft with an elongate helical land formed therein defining a flute between adjacent turns on the elongate helical land. The auger portion has a central longitudinal axis. A shank is integrally connected to one end of the elongate auger portion and is adapted to engage a drill. A lead screw is integrally connected to the other end of the elongate auger portion for engaging the workpiece. A releasably attachable multipurpose blade has a chisel blade portion extending outwardly from the leading edge of the elongate helical land for chipping material from the workpiece, a shearing blade portion extending into the flute between adjacent turns of the elongate helical land and a spur portion extending longitudinally from the elongate helical land in the direction of the lead screw.

Further features of the invention will be described or become apparent in the course of the following detailed description.

BRIEF DESCRIPTION OF DRAWINGS

The drawings will now be described by way of example only, with reference to the accompanying drawings, in which.

DETAILED DESCRIPTION OF THE INVENTION

Figure 1:
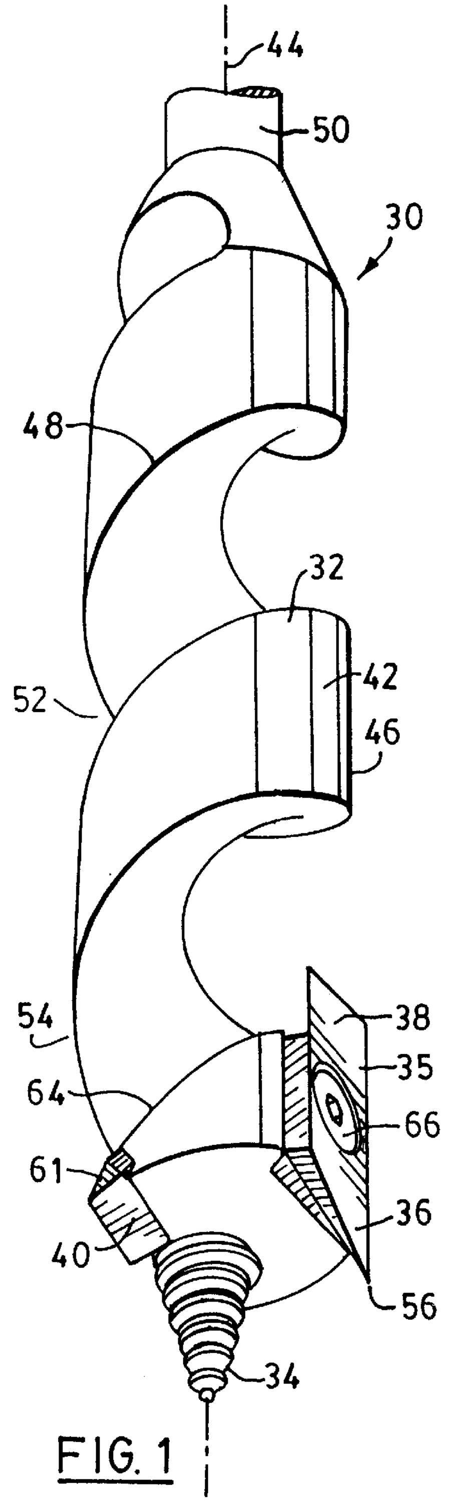
FIG. 1 is a perspective view of a wood auger bit constructed in accordance with the present invention.
Figure 2:
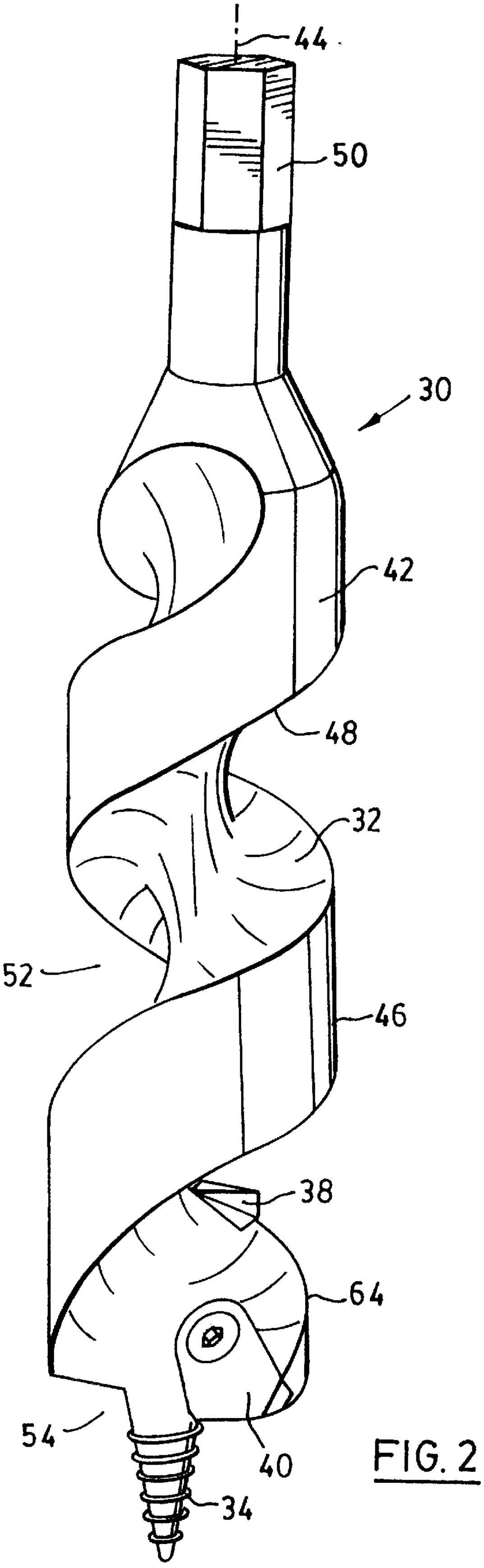
FIG. 2 is a perspective view of the auger bit of FIG. 1 as seen 90° from the view of FIG. 1.
Figure 7:
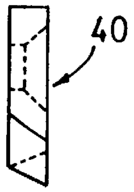
FIG. 7 is side view of removable chisel blade of FIG. 4.
Figure 4:
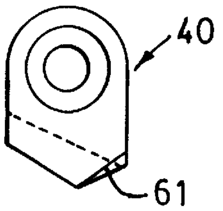
FIG. 4 is a top view of the removable chisel blade.
Figure 5:
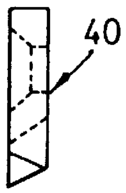
FIG. 5 is a side view of the removable chisel blade of FIG. 4.
Figure 6:
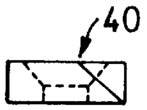
FIG. 6 is an end view of removable chisel blade of FIG. 4.
Figure 3:
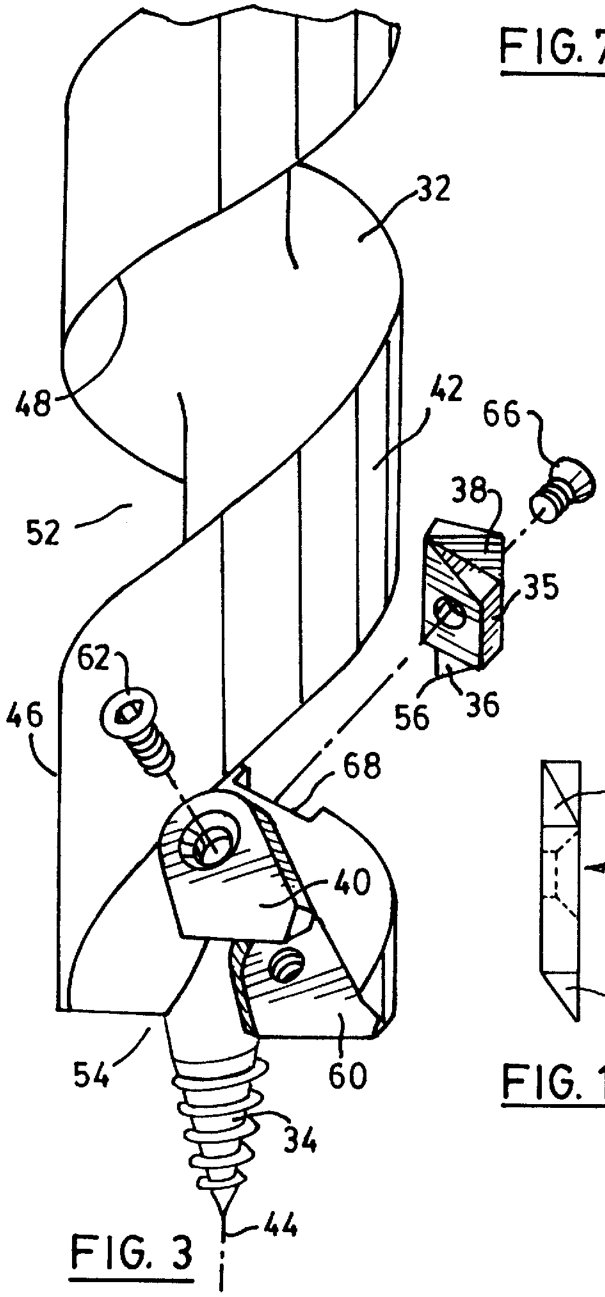
FIG. 3 is a partial disassembled perspective view of the wood auger bit of FIG. 1.

Referring to the drawings and in particular FIGS. 1 to 3 the auger bit of the present invention is shown generally at 30. Auger bit 30 has an elongate auger portion 32, a lead screw 34, a spur 36 (not shown in FIG. 2), a shearing blade 38, and a chisel blade 40.

Auger portion 32 includes an elongate shaft 42 having a longitudinal central axis 44. An outer surface 46 of the elongate shaft 42 has elongate helical land 48 formed therein which extends from the lead screw 34 to the shank 50. Shank 50 is used to engage auger bit 30 in a tool, typically a motorized drill (not shown). The space between the elongate helical land 48 and the adjacent turn on the land 48 is the flute 52. The lead portion of flute 52 is the throat 54. The auger portion 32 is designed to remove the waste material from the workpiece during operation of the drill bit.

It has been found that the depth of the flute 52 can affect the ability of auger bit 30 to effectively remove the waste material during operation. Specifically, the greater depth of the flute the more easily the waste is removed. This must be balanced against the characteristic that as the depth of the flute increases the strength of the drill bit as a whole is reduced, since the amount of material in the drill bit is reduced. In addition, as adjacent turns of the elongate helical lands 48 are spaced further apart it is increasingly more difficult to keep the drill bit aligned when in use.

Lead screw 34 is a self-feeding screw such that in use the lead screw causes the bit 30 to be urged into the workpiece. Lead screw 34 has a maximum diameter which is substantially less than the diameter of the auger portion 32.

Preferably, spur 36 extends slightly outwardly from the elongate helical land 48 and extends longitudinally in the direction of lead screw 34. The distal edge 56 of spur 36 extends further in the longitudinal direction than the chisel blade 40. Spur 36 defines the outside diameter of the bore hole of auger bit 30. Spur 36 extends outwardly from the outer surface 46 of land 48, thus the diameter inscribed by the spur is slightly larger than diameter of the elongate auger portion. Preferably the angle at which spur 36 is angled outwardly from the longitudinal axis 44 is between 1° to 2°. The slight angle allows elongate auger portion 32 to move freely through the bore hole but the angle is not so large that the drill bit becomes difficult to align. Further, the slight angle helps to reduce the drag on the wood auger bit when it is in use and it makes removal of the auger, once the hole is cut from workpiece, much easier.

Chisel blade 40 extends outwardly from the leading edge of elongate helical land 48. Chisel blade 40 removes the material between the outside radius and lead screw 34. Preferably chisel blade 40 is removable and replaceable.

Referring to FIG. 3 a chisel seat 60 is formed in the lead edge of elongate helical land 48 and is shaped to receive chisel blade 40. Detailed drawings of chisel blade 40 shown in FIGS. 4 through 7. Chisel seat 60 is adapted to receive chisel blade 40 such that chisel blade acts as a continuation of elongate helical land 48. A set screw 62 attaches the chisel blade 40 to the elongate helical land 48. Chisel seat 60 and set screw 62 are configured such that as auger bit 30 revolves and chisel blade 40 engages the workpiece the chisel blade is forced back into chisel seat 60 and into tight engagement with land 48. Preferably chisel blade 40 is shaped so that outside edge portion 61 extends slightly outwardly from the elongate helical land 48 so that in use chisel blade 40 will wear rather than helical land 48.

As shown in FIGS. 1 and 2, shearing blade 38 extends longitudinally from the helical land closest to the lead screw 34 towards the next adjacent land. Shearing blade 38 provides a cutting edge on the following portion 64 of helical land 48 proximate to the throat 54. Shearing blade 38 ensures that any residual material that may have been missed by spur 36 and chisel blade 40 is removed. It has been found that to ensure that waste material can be easily removed by drill bit 30, it is desirable to increase the depth of throat 54. The amount that the depth of the throat 54 needs to be increased will be dependent on the depth of the flute 52 and the spacing of the elongate helical lands 48. For example where adjacent turns of the helical lands 48 are relatively close together and the depth of the flute 52 is relatively shallow, the depth of the throat adjacent to the shearing blade 38 will need to be increased so that drill bit 30 does not get clogged with wood chips during use.

Figure 10:
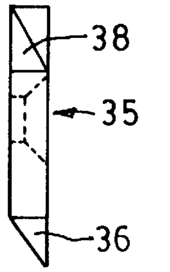
FIG. 10 is a side view of the removable unitary blade of FIG. 8.
Figure 8:
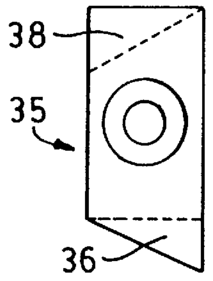
FIG. 8 is a top view of removable unitary blade.
Figure 9:
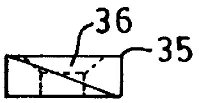
FIG. 9 is an end view of removable unitary blade of FIG. 8.
Figure 11:
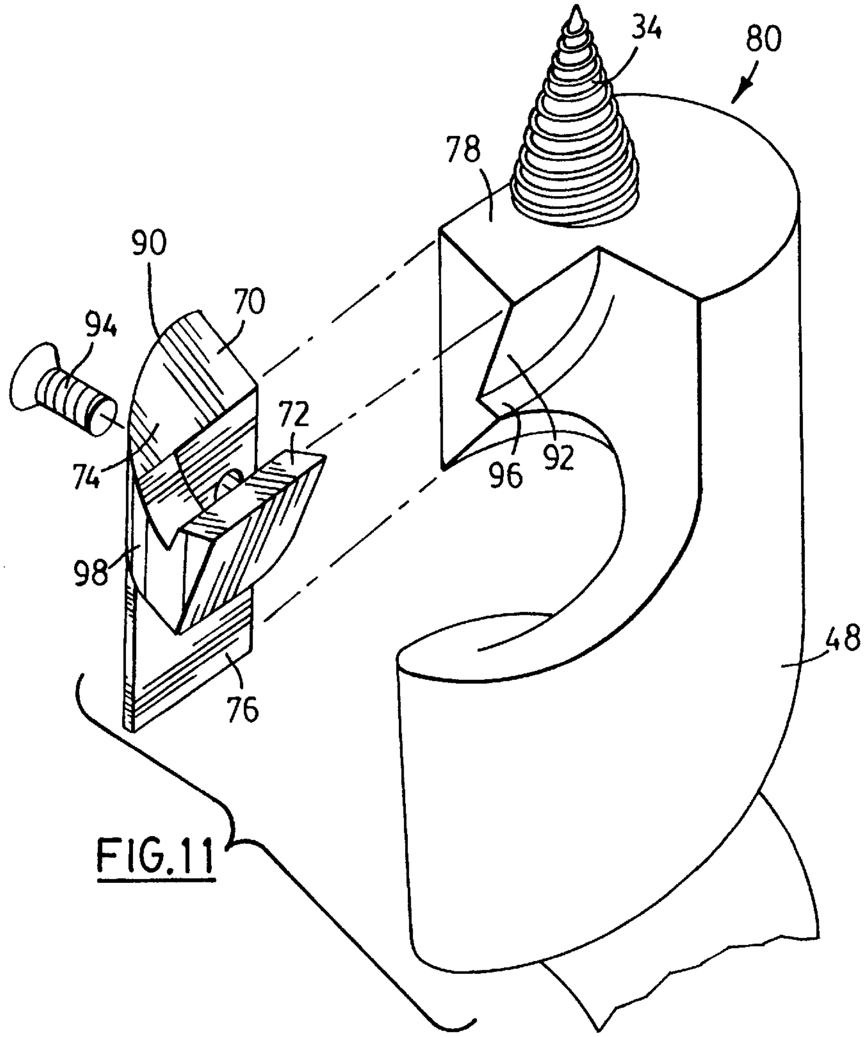
FIG. 11 is an enlarged perspective view of an alternate embodiment of the auger bit of the present invention showing a multipurpose blade.
Figure 13:
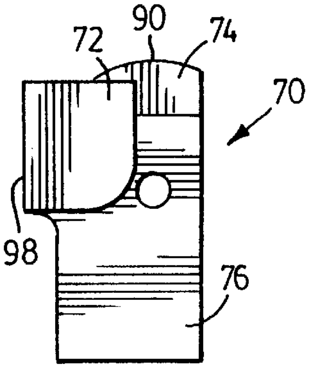
FIG. 13 is a side view of the multipurpose blade shown in FIG. 11 as seen 90° from the view of FIG. 12.
Figure 14:
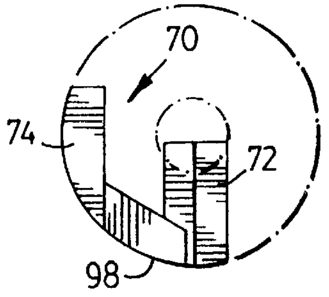
FIG. 14 a top view of the multipurpose blade shown in FIG. 11.
Figure 12:
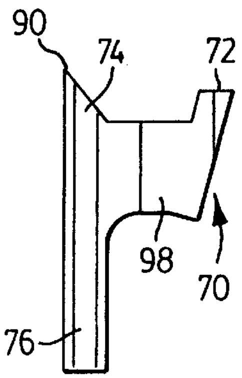
FIG. 12 is a side view of the multipurpose blade shown in FIG. 11.

Preferably shearing blade 38 and spur 36 are a removable and replaceable unitary component or blade 35. Detailed drawings of unitary blade 35 are shown in FIGS. 8 through 10. Unitary blade 35 is attached to land 48 with a set screw 66. A groove or seat 68 (shown in FIG. 3) is formed in land 48 to receive unitary blade 35 such that in position the shearing blade 38 is generally aligned with outer surface 46 of shaft 42. Seat 68 and set screw 66 are configured such that as auger bit 30 revolves and the unitary blade 35 engages the workpiece it is forced back into seat 68 and into tight engagement with land 48.

Referring to FIGS. 11 through 14 an alternate removable multipurpose blade is shown at 70. Multipurpose blade 70 includes a chisel portion 72, a spur portion 74 and a shearing portion 76. Each portion functions similar to that described above. Multipurpose blade 70 fits onto and wraps around end portion 78 of auger drill bit 80. Bit 80 is similar to that described above and only those portions which are different will be described hereafter. The remaining features are as described above and reference numerals used above will be used herein and shown on FIG. 11.

Chisel portion 72 of multipurpose blade 70, when in position on bit 80, extends outwardly from the leading edge of elongate helical land 48. Spur portion 74 extends slightly outwardly from elongate helical land 48 and extends longitudinally in the direction of lead screw 34. The distal edge 90 of spur 74 extends further in the longitudinal direction than chisel portion 72. In position, shearing portion 76 extends longitudinally from the helical land closest to the lead screw 34 towards the next adjacent turn of the land.

End portion 78 of auger drill bit 80 has a seat 92 for receiving multipurpose blade 70 thereon. A set screw 94 is provided to secure multipurpose blade 70 in place. Seat 92 has a ledge 96 formed therein and the wrap portion 98 of multipurpose blade 70 proximate to the chisel portion 72 is adapted to sit on seat 92 and ledge 96 when multipurpose blade 70 is in position.

Wrap portion 98 of multipurpose blade 70 is shaped such that there is a smooth transition between the spur portion 74, the shearing portion 76 and the chisel portion 72. Wrap portion 98 continues the helical shape of helical land 48. Multipurpose blade 70 is shaped such that the blade can only be positioned one way on auger bit 80 and thus minimizes the risk of a user installing the blade incorrectly.

Figure 15:
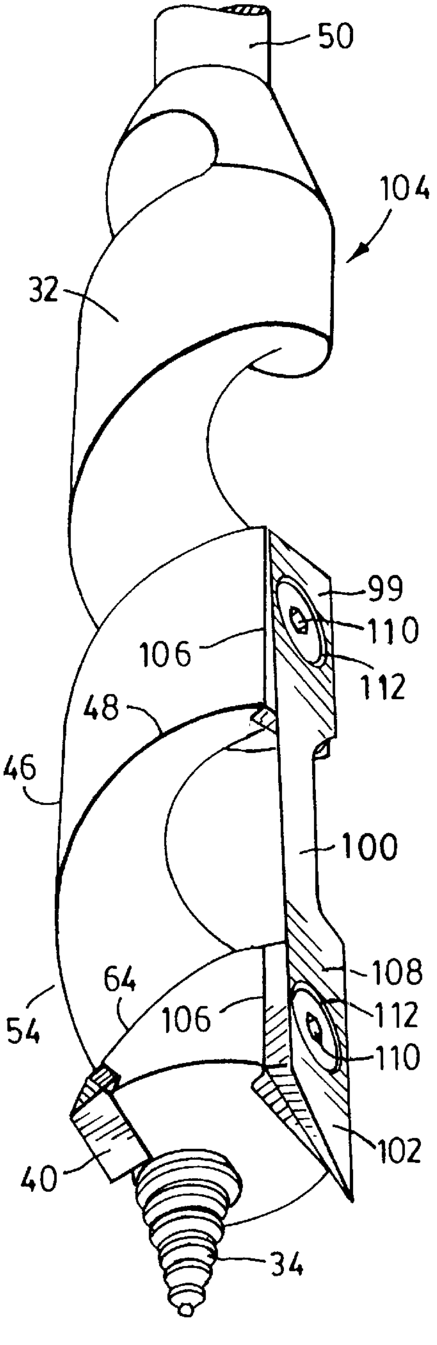
FIG. 15 is a perspective view of an alternate embodiment of the auger bit of the present invention showing a shearing blade that extends between adjacent lands.

Referring to FIG. 15, an alternate removable unitary elongate blade 99 includes a shearing blade 100 and spur 102 is shown attached to auger bit 104. Shearing blade 100 extends longitudinally between and bridges adjacent turns on the elongate helical land 48 from the turn closest to the lead screw 34 to the next adjacent turn and thereby extends into the flute between the turns. Unitary elongate blade 99 is recessed in auger portion 32 so that it is generally co-planar with the outer surface 46. It is positioned as close to throat 54 as practicable. Shearing blade 100 provides a cutting edge on the following portion 64 of helical land 48 proximate to throat 54.

Referring to FIG. 15, a shear/spur seat 106 is formed in adjacent turns on the elongate helical land 48. Shear/spur seat 106 is dimensioned to receive unitary elongate blade 99. Shear/spur seat 106 is formed so that when unitary elongate blade 99 is attached to auger portion 32 the outer surface 108 of unitary elongate blade 99 is generally co-planar with elongate helical land 48. A pair of set screws 110 are used to removably attach unitary elongate blade 99 to the elongate helical lands 48. Set screws 110 are counter sunk in hole 112 so that their heads do not extend beyond the outer surface 108 of unitary elongate blade 99.

Figure 16:
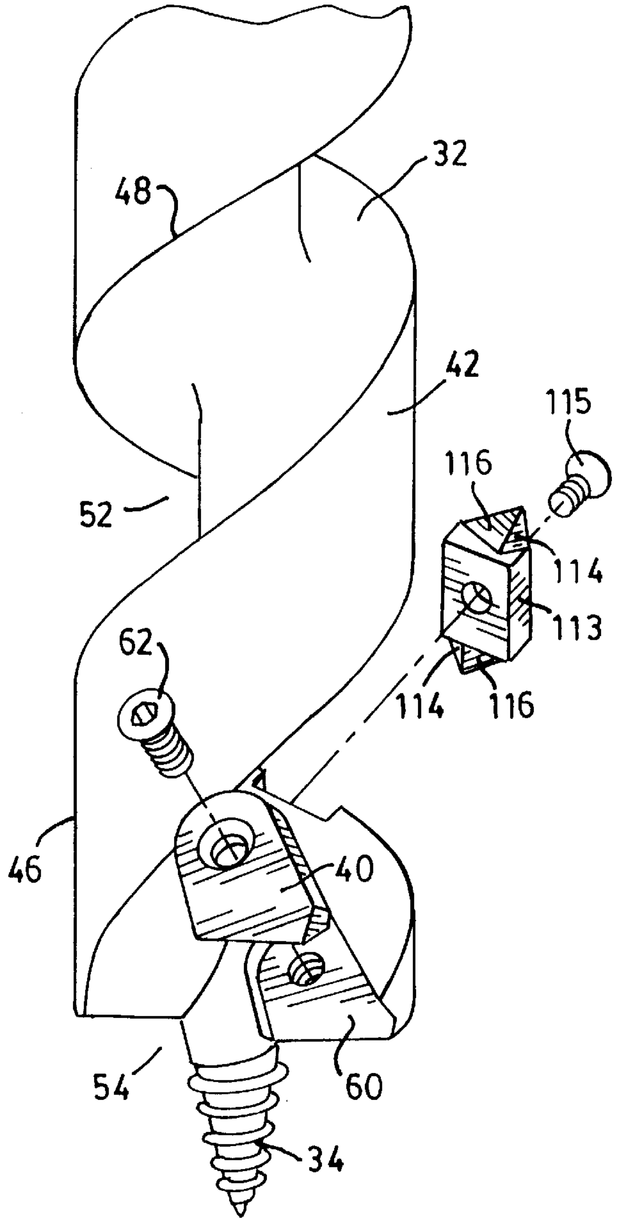
FIG. 16 is a partial disassembled perspective view of an alternate embodiment of the auger bit of the present invention showing a reversible unitary blade.

Many variations for the shearing blade and spur can be used. Clearly certain designs will work better under certain conditions. By having a removable unitary shearing blade and spur, one auger bit can be used in a variety of applications. Further, when the blade wears down, as will inevitably occur with use, the blade can be easily replaced. Alternatively, by providing a blade that is removable, the blade can also be sharpened and then reattached. One such variation is shown in FIG. 16 wherein unitary blade 113 is reversible. Each side of the reversible blade has a shearing edge 114 and a spur edge 116. A set screw 115 is used to secure unitary blade 113 in place. Thus, in use, when one side of the reversible blade 113 is dull it can simply be rotated to provide sharp cutting edges. Similarly a reversible chisel blade could be used so that when one side of the blade becomes dull it is reversed and the other side is used. In addition, other variations could also be used such as an elliptical unitary blade so that as one portion of the blade becomes dull the blade is rotated to a sharper section.

Figure 18:
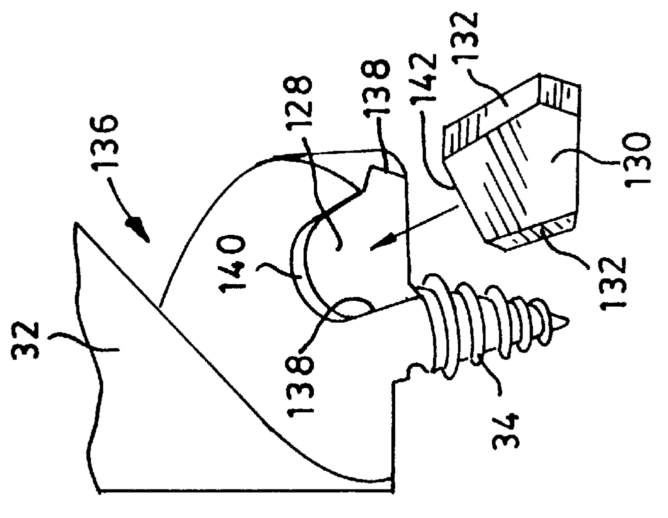
FIG. 18 is a partial disassembled perspective view of the embodiment of FIG. 17 rotated 90°.
Figure 17:
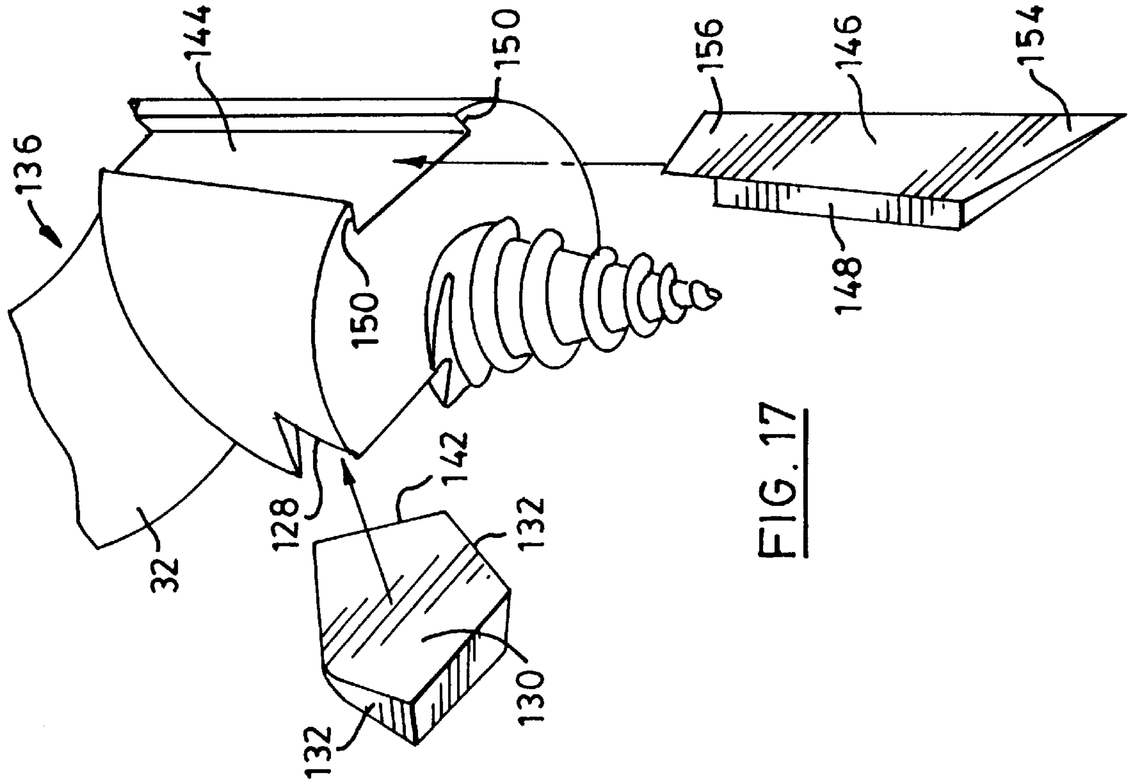
FIG. 17 is a partial disassembled perspective view of an alternate embodiment of the auger bit of the present invention showing pressure fit blades.

Similarly, many variations in the means of attaching the blades to the auger portion could be used, one such variation is shown in FIGS. 17 and 18 wherein a pressure fit connection is used.

Referring to FIGS. 17 and 18, a tapered dovetail chisel seat 128 and tapered dovetail chisel blade 130 are shown, with the tapered dovetail chisel blade 130 has chisel dovetail portions 132 that engage chisel seat dovetails 138 in the auger portion 32 of wood auger bit 136. Dovetail chisel seat 128 is tapered to correspond with the taper of chisel blade 130. Dovetail chisel seat 128 has a curved back portion 140. Chisel blade 130 has a straight back portion 142. Thus when in position there will be a space between the curved back portion 140 of dovetail chisel seat 128 and straight back portion 142 of dovetail chisel blade 130. This allows the user to wedge a screwdriver or the like therebetween to remove dovetail chisel blade 130.

Referring to FIG. 17, a tapered dovetail shearing/spur seat 144 and tapered dovetail unitary blade 146 are shown, with the tapered dovetail unitary blade 146 having dovetail portions 148 that engage shearing/spur seat dovetails 150 in the auger portion 32 of the wood auger bit 136. Dovetail shearing/spur seat 144 is tapered to correspond with the taper of tapered dovetail unitary blade 146. The tapered dovetail unitary blade 146 has spur portion 154 and shearing portion 156.

The tapered dovetail shape of the seat and blade allow the blade to be held in position by friction only, eliminating the need of fasteners and therefore increasing the ease of changing the blades in the field. The tapered dovetail nature of the seat is arranged so that in operation, the forces of the auger portion on the blade and visa versa would force the blade into tighter and tighter engagement with the seat. When replacement of the blade is desired, a force in the opposite direction, as from a punch or screwdriver, is all that would be required to dislodge the blade from its tight engagement with the seat.

Figure 19:
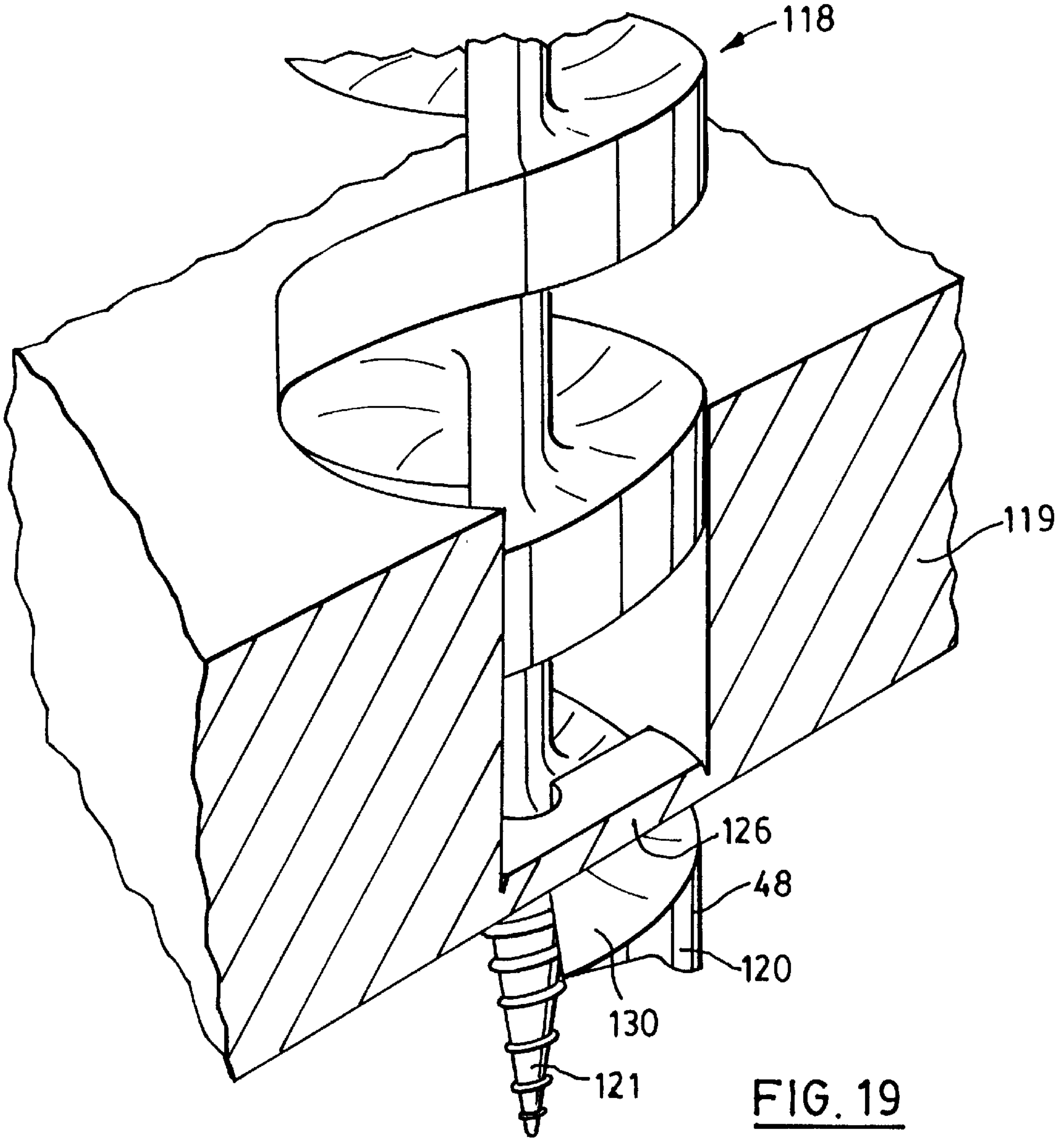
FIG. 19 is a perspective view of a prior art auger with the workpiece shown partially broken away.

Referring to FIG. 19, in a typical prior art auger bit 118 with a spur, the spur 120 is fixedly attached to the elongate helical land 48. During use the spur becomes dull and some users feel that when the spur is dull it is more of a hindrance than a help. Therefore it is advantageous to provide a spur 36 which is removable and replaceable as shown in the present invention.

Figure 20:
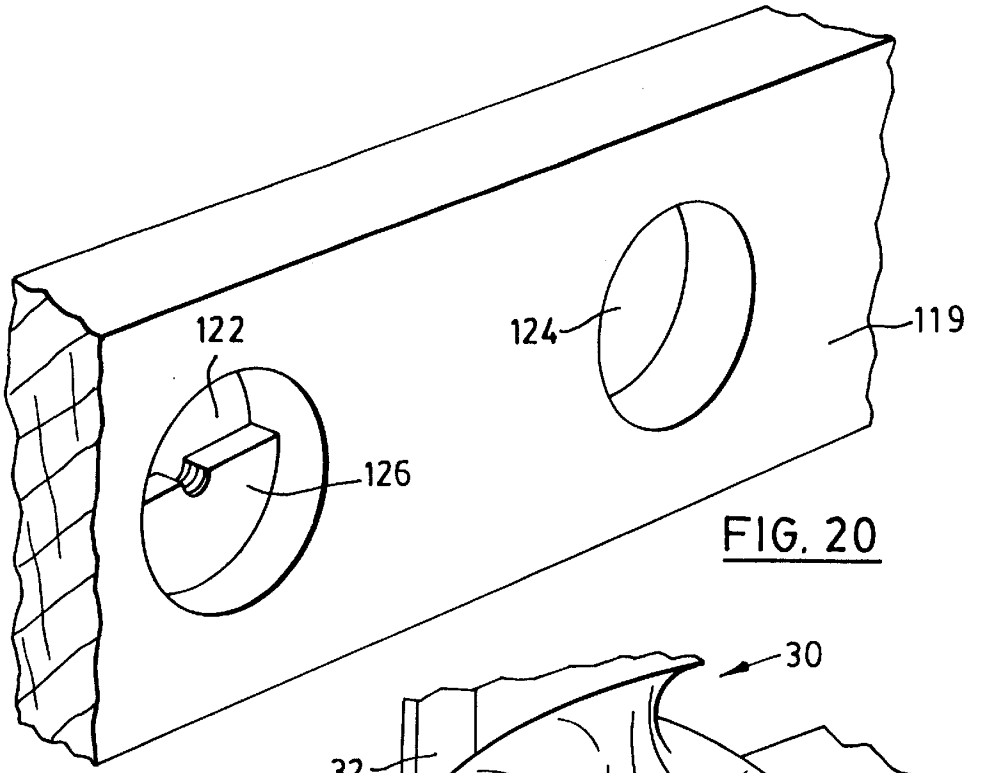
FIG. 20 is a perspective view of a workpiece showing the "D" shaped hole cut by the prior art augers and the round hole cut by the wood auger of the present invention.

Referring to FIG. 19, in use, with prior art auger bits 118, as the self-feeding lead screw 121 of the rotating bit is introduced to the workpiece 119 a self-feeding action is promoted thus drawing in the bit to such an extent that the spur is compelled to scribe a circle around the point of introduction and so sever the fibres along this circle. The continuing rotation of the bit and subsequent advancement of the bit causes the chisel cutting edge to uplift the fibres previously severed, forming chips. Friction between the chips and the cylindrical surface of the created bore and the helical inclination of flute cause the chips to advance away from the chisel cutting edge and ultimately out of the bore. This process continues until the self-feeding lead screw emerges from the opposite (back) side of the workpiece. As the lead screw breaks through the opposite (back) side of the workpiece the self-feeding function of the lead screw is progressively lost and the bit is then forcibly advanced by the operator. Due to the loss of self-feeding function, there is a substantial decrease in the cutting action and a subsequent increase in drill rpm. Depending on the resiliency and specific nature of the wood composition (knots or nails for example) at the exit location of the workpiece, often a portion 126 of the workpiece will not be removed and thus a "D" shaped hole will result with the self-feeding lead screw 121, spur 120, the chisel cutting edge 130 and a portion of the body of the bit extending out of the workpiece through the hole as shown in FIG. 20 at 122.

Figure 21:
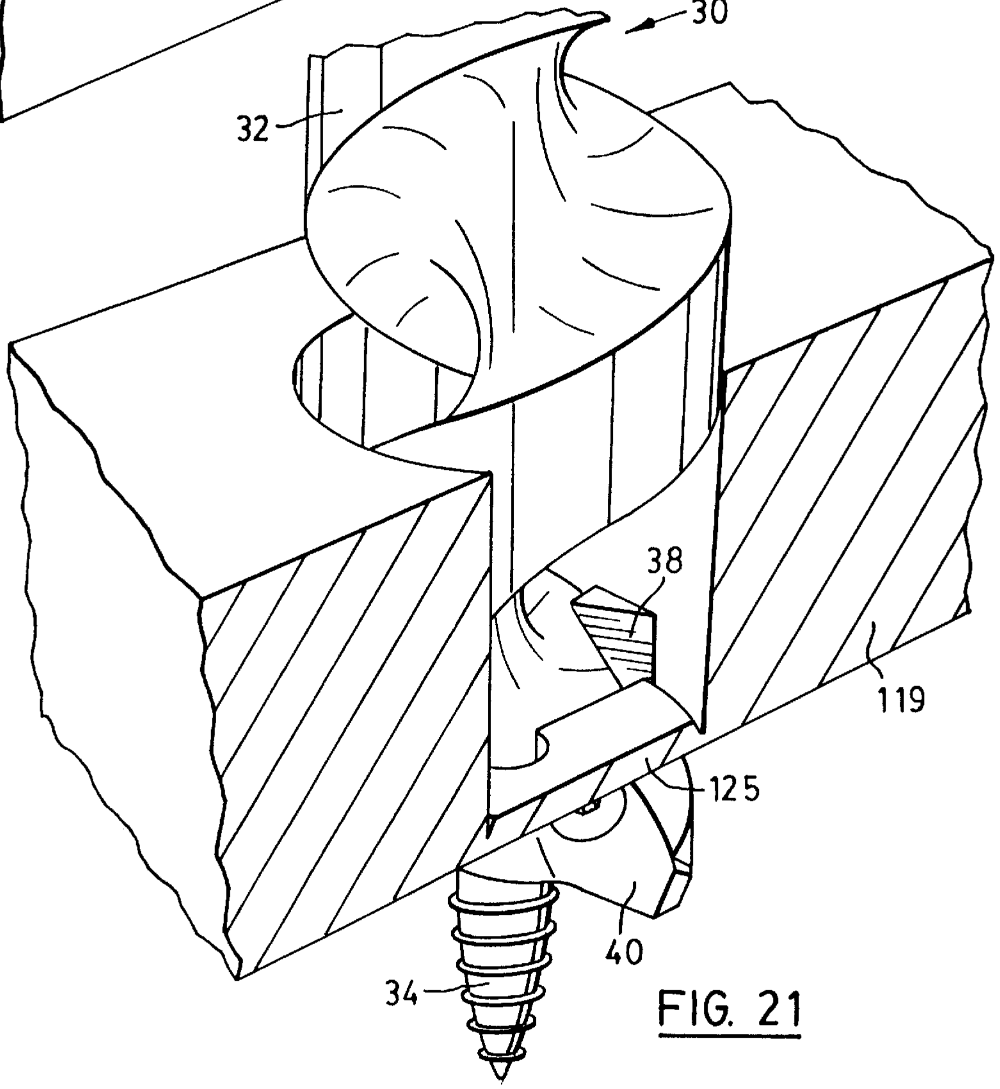
FIG. 21 is a partial perspective view of the wood auger bit of FIG. 1 with the workpiece shown partially broken away.

Referring to FIG. 21, compare this to the bit of the present invention an example of which is auger bit 30, wherein, in use, as the self-feeding lead screw of the rotating bit is introduced into a portion of workpiece 119 a self-feeding action is promoted thus drawing in the bit to such an extent that the spur is compelled to scribe a circle around the point of introduction and so sever the fibres along this circle. The continuing rotation of the bit and subsequent advancement of the bit causes the chisel cutting edge to uplift the fibres previously severed, forming chips. Friction between the chips and the cylindrical surface of the created bore and the helical inclination of the flute cause the chips to advance away from the chisel cutting edge and ultimately out of the bore. This process continues until the self-feeding lead screw emerges from the opposite (back) side of the workpiece. As the lead screw breaks through the opposite (back) side of the workpiece the self-feeding function of the lead screw is progressively lost and the bit is then forcibly advanced by the operator. As bit of the present invention advances along this "D" shaped hole the shearing blade 38 will engage that portion at 125 on FIG. 21 of the opposite (back) side of the workpiece and cut through it thereby resulting in a circular bore hole, as shown in FIG. 20 at 124, rather than a "D" shaped hole as often resulted with prior art auger bits.

It will be appreciated that the above description related to embodiments by way of example only. Many variations on the invention will be obvious to those skilled in the art and such obvious variations are within the scope of the invention as described herein whether or not expressly described.

What is claimed as the invention is:

1. An auger bit for forming bores having a circular cross section in a workpiece and for use with a drill, comprising:

an elongate auger portion having an elongate shaft with an elongate helical land formed therein defining a flute between adjacent turns on the elongate helical land and having a central longitudinal axis, a leading edge and a following portion;

a shank integrally connected to one end of the elongate auger portion and adapted to engage the drill;

a lead screw integrally connected to the other end of the elongate auger portion for engaging the workpiece;

a chisel blade extending outwardly from the leading edge of the elongate helical land for chipping material from the workpiece; and a cutting edge extending longitudinally from the following portion of the elongate helical land proximate to the leading edge.

2. An auger bit as claimed in claim 1 wherein the cutting edge is a shearing blade extending into the flute between adjacent turns of the elongate helical land.

3. An auger bit as claimed in claim 2 wherein the shearing blade extends between and is attached to adjacent turns of the elongate helical land.

4. An auger bit as claimed in claim 2 wherein the shearing blade partially extends between adjacent turns of the elongate helical land.

5. An auger bit as claimed in claim 2 wherein shearing blade is a removable blade.

6. An auger bit as claimed in claim 1 further including a spur extending longitudinally from the elongate helical land in a direction of the lead screw.

7. An auger bit as claimed in claim 2 further including a spur extending longitudinally from the elongate helical land in a direction of the lead screw and wherein shearing blade and spur are integrally attached to form a removable unitary shearing blade and spur.

8. An auger bit as claimed in claim 7 wherein the spur is angled slightly outwardly from the helical land.

9. An auger bit as claimed in claim 2 wherein the chisel blade and shearing blade are integrally attached to form a multipurpose removable blade.

10. An auger bit as claimed in claim 2 further including a spur extending longitudinally from the elongate helical land in a direction of the lead screw and wherein the shearing blade, spur and chisel blade are an integrally formed multipurpose removable blade.

11. An auger bit as claimed in claim 10 wherein the spur is angled slightly outwardly from the helical land.

12. In an auger bit for forming bores having a circular cross section in a workpiece and for use with a drill wherein the auger bit includes an elongate auger portion having an elongate helical land formed therein defining a flute between adjacent turns thereof, the elongate helical land having a central longitudinal axis and a leading edge, a shank integrally connected to one end of the elongate auger portion and adapted to engage the drill, a lead screw integrally connected to the other end of the elongate auger portion for engaging the workpiece, and a chisel blade extending outwardly from the leading edge of the elongate helical land for chipping material from the workpiece, the improvement comprising:

a releasably attachable unitary blade having a shearing blade portion extending into the flute between adjacent turns of the elongate helical land and a spur portion extending longitudinally from the elongate helical land in a direction of the lead screw.

13. In an auger bit for forming bores having a circular cross section in a workpiece and for use with a drill wherein the auger bit includes an elongate auger portion having an elongate helical land formed therein defining a flute between adjacent turns thereof, the elongate helical land having a central longitudinal axis and a leading edge, a shank integrally connected to one end of the elongate auger portion and adapted to engage the drill, and a lead screw integrally connected to the other end of the elongate auger portion for engaging the workpiece, the improvement comprising:

a releasably attachable multipurpose blade having a chisel blade portion extending outwardly from the leading edge of the elongate helical land for chipping material from the workpiece, a shearing blade portion extending into the flute between adjacent turns of the elongate helical land and a spur portion extending longitudinally from the elongate helical land in a direction of the lead screw.

* * * * *